(No Model.) 2 Sheets—Sheet 1.
T. W. KNIGHT.
COMBINED CORN AND COTTON PLANTER.
No. 486,478. Patented Nov. 22, 1892.
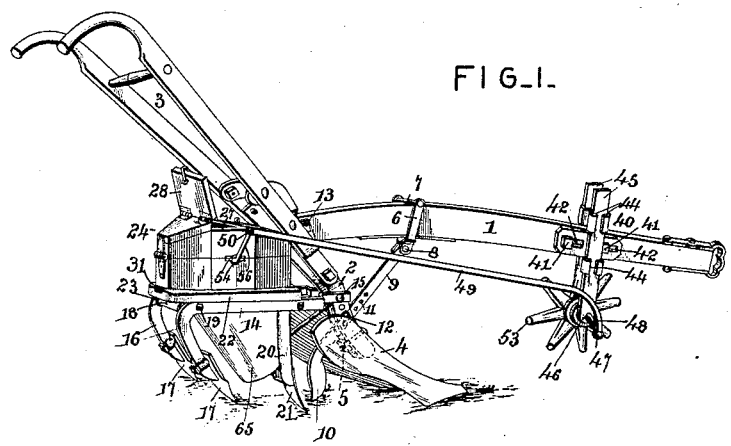
FIG. I.
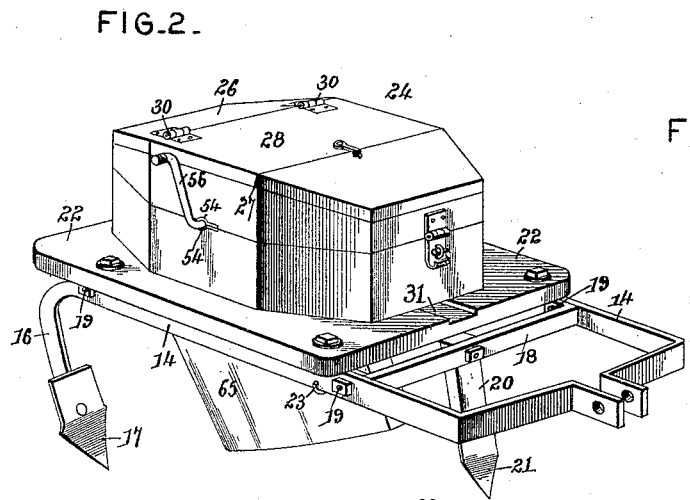
FIG. 2.
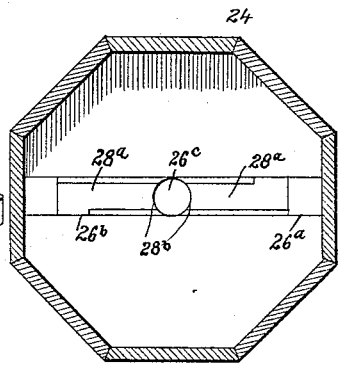
FIG. II.
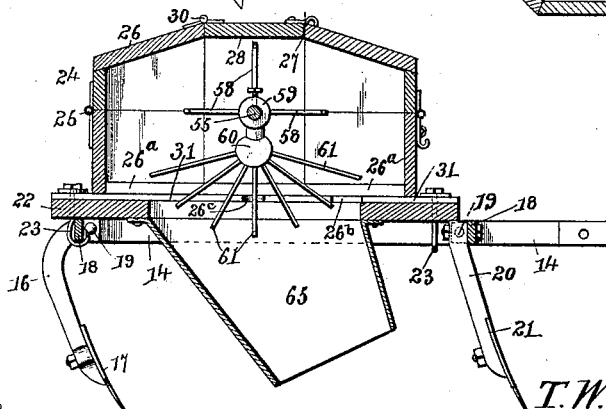
FIG. 3.
Witnesses
Jas. L. McCathran
John M. Diggers
Inventor
T. W. Knight
By his Attorneys,
C. A. Snow & Co.

(No Model.) 2 Sheets—Sheet 2.

T. W. KNIGHT.
COMBINED CORN AND COTTON PLANTER.

No. 486,478. Patented Nov. 22, 1892.

Witnesses
Jas. K. McGathran
J. N. Diggers

Inventor
T. W. Knight
By his Attorneys,
C. A. Snow & Co.

UNITED STATES PATENT OFFICE.

THADDEUS W. KNIGHT, OF TAYLOR, TEXAS.

COMBINED CORN AND COTTON PLANTER.

SPECIFICATION forming part of Letters Patent No. 486,478, dated November 22, 1892.

Application filed May 25, 1892. Serial No. 434,325. (No model.)

*To all whom it may concern:*

Be it known that I, THADDEUS W. KNIGHT, a citizen of the United States, residing at Taylor, in the county of Williamson and State of Texas, have invented a new and useful Combined Corn and Cotton Planter, of which the following is a specification.

My invention relates to improvements in combined corn and cotton planters, the objects in view being to provide attachments for ordinary plows whereby they are converted from such to either a corn or cotton planter capable of effectual operation.

Various other objects and advantages of the invention will appear in the following description, and the novel features thereof will be particularly pointed out in the claims.

Figure 4:
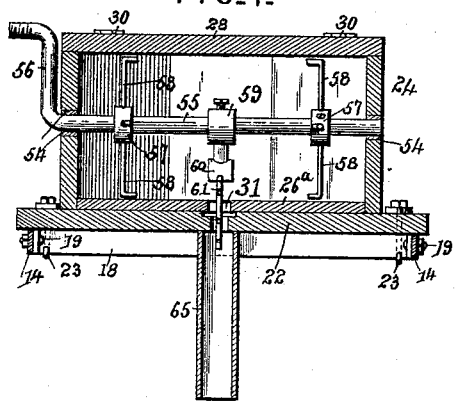
Figure 5:
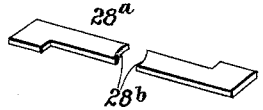
Figure 6:
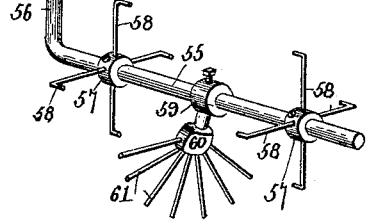
Figure 7:
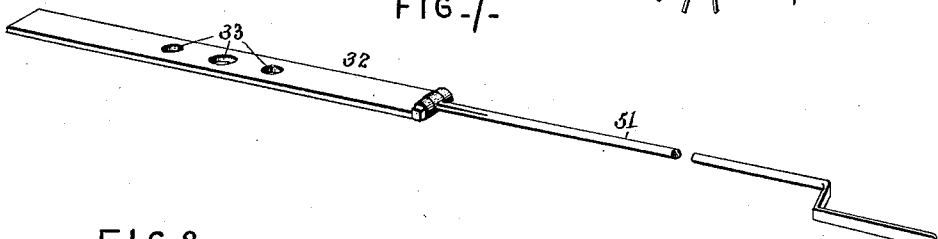
Figure 8:
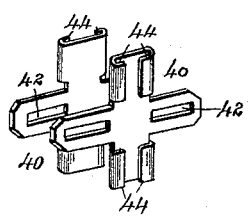
Figure 9:
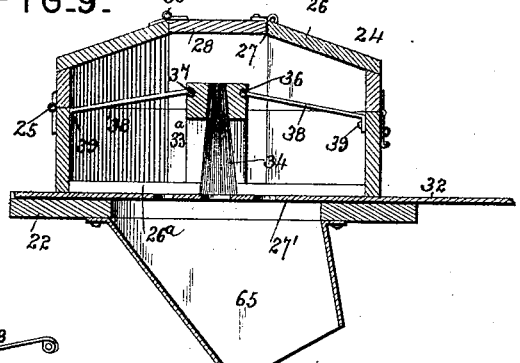
Figure 10:
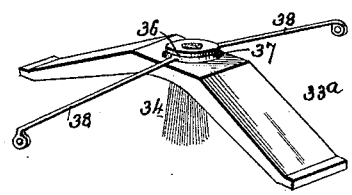

Referring to the drawings, Figure 1 is a perspective view of a machine constructed in accordance with my invention. Fig. 2 is a detail in perspective of the planting attachment. Fig. 3 is a longitudinal section thereof. Fig. 4 is a transverse section. Fig. 5 is a detail of the hopper-opening bottom-closing plates. Fig. 6 is a detail in perspective of the cotton-seed-agitator shaft. Fig. 7 is a detail in perspective of the seed-slide. Fig. 8 is a detail in perspective, of the wheel-standard-adjusting plates. Fig. 9 is a detail in section of the hopper as employed for planting corn. Fig. 10 is a detail of the brush cutoff. Fig. 11 is a plan of the bottom of the hopper.

Like numerals of reference indicate like parts in all the figures of the drawings.

The beam 1 is of the ordinary construction, the same being provided at its front end with the clevis and at its rear end with the bifurcated standard 2 and outwardly-disposed handles 3. The standard is provided at its lower end with the double-moldboard or shovel plow 4 for forming the furrow, and the heel-bolt 5 passes through the shovel or plow and between the bifurcations of the standard. A clamp 6 embraces the opposite sides of the beam 1, upper and lower bolts 7 and 8, respectively, passing through the clamp above and below the beam and the latter bolt also passing through the upper end of an inclined rudder-bar 9, which passes downwardly and rearwardly between the bifurcations of the standard and terminates in rear of said standard in a blade 10. Adjacent to its point of intersection with the standard the rudder-bar is provided with a series of adjusting-holes 11, and a transverse bolt 12 may be passed through any one of the same and through openings formed in the standard, whereby, the standard being pivoted to the beam by the bolt 13, the standard and rudder-bar may be adjusted with relation to each other, and the said rudder-bar will serve to steady the plow or shovel when in operation.

14 designates a pair of supplemental beams, preferably formed of strap-iron, and the same have their front ends converged, embracing and bolted at 15 to the standard 2 of the plow. The rear ends of these beams 14 are downwardly bent and inclined forward to form a pair of standards 16, and each at its lower extremity has attached thereto a small covering-shovel 17. The beams 14 are connected at their front and rear portions by cross-bars 18, which have their extremities bent and bolted to the beams by bolts 19. To the front cross-bar at its center there is secured a depending standard 20, and the same carries at its lower extremity, in rear of the plow 4 and blade 10, an opening-shovel 21.

A platform 22 surmounts the beams 14 and cross-bars 18, and the same is secured in position upon the beams and bars by J-shaped bolts 23, that extend through perforations in the platform, and at their lower bent ends engage with the under edges of the beams and bars. The platform constitutes the bottom for, in this instance, an octagonal-shaped hopper 24, and the same has hinged to its upper rear edge at 25 a cover 26. The roof of the cover has an opening 27, and to one side of it a lid 28 is hinged at 30.

The platform or bottom 22 of the hopper is provided with a longitudinal slot 26ª, provided at its ends with offsets 26ᵇ and at its opposite edges with semicircular openings 26ᶜ. The slot is used when planting cotton but; when planting corn a pair of L-shaped fillingplates 28ª are inserted in the slot and offset, and as their meeting ends are curved or concaved at 28ᵇ they combine with the semicircular openings 26ᶜ.

The hopper-bottom is provided in line with and directly above the plates with the opening 31, in which when the machine is used as a corn-planter is designed to be mounted the reciprocating seed-slide 32. This seed-slide may be provided with one or more openings 33, so that when the slide is reciprocated it will when its openings register with the circular corn-discharge opening formed by the plates 28$^a$ drop or discharge the corn. A suitable cut-off device may be arranged over the slide, and I have herein illustrated the one that I prefer to employ, the same being shown in detail in Fig. 10. This device consists simply of a transversely-disposed block 33$^a$, the same being arched, so as to span the bottom of the hopper and rest thereon at its extremities. The block is provided at its center with perforations, through which depend bristles 34, which lie upon the slide directly above the opening in the hopper. The upper side of this block is provided with an annular projection 36, and the same has its edge undercut to receive a ring 37, to the opposite sides of which a pair of wires 38 are connected, the extremities of the wires being removably secured by screws 39 to the front and rear walls of the hopper.

40 designates a pair of X-shaped metal plates, one of which is applied to each side of the beam 1 by means of bolts 41, which are passed through slots 42, formed in the horizontal branches of the plates, whereby said plates may be adjusted longitudinally upon the beam. The vertical branches of the plates above and below the horizontal branches have their edges inwardly turned to form flanges 44, and these flanges receive a pair of opposite vertical standards 45, which depend from the beam. These standards at their lower ends are provided with bearings 46, and in the same is journaled a transverse axle 47, which terminates at one end in a crank 48. To this crank there is connected a rearwardly-disposed pitman-rod 49, and to the pitman-rod, which latter terminates at its rear end to one side of the hopper, there is pivotally connected at 50 a connecting-rod 51, the rear end of which is pivotally connected to the front end of the seed-slide when the latter is used, and it is by the movements of the crank and pitman-rod that the seed-slide receives its motion. Motion is imparted to the crank and its axle upon which it is formed in this instance by a star-shaped ground-wheel 53.

The meeting edges of the hopper and its cover are provided with half-bearings 54, and in the same is removably journaled a transverse agitator-shaft 55. This agitator-shaft is provided at one of its extremities with a crank 56, and near its opposite ends with hubs 57, from which radiate stirring-arms 58. At its center the shaft is provided with a hub 59, and to the same there is secured a block 60, having a series of radiating arms 61, adapted to oscillate through the slot in the bottom of the hopper. The hubs 57 and 57 are designed to slide upon the shaft and may be held at any point through the medium of set bolts or screws. The crank 56, it will be understood, is connected to the rear end of the pitman 49, so that, being longer than the crank 48, a rotary motion of the latter crank will cause an oscillating or half-rotary motion upon the part of the agitator-shaft. This agitator-shaft is only employed when the machine is operated for planting cotton-seed, and constitutes an efficient means for positively feeding the seed from the hopper. When it is desired to plant corn, the agitator-shaft is removed, the L-shaped plates 28$^a$ and 28$^b$ are adjusted so as to close the slot, the seed-slide inserted, and the connecting-rod 51 connected with the slide.

From the foregoing description it will be obvious that the attachment may be applied to any ordinary plow, whereby the same is converted from such to an efficient planter. In operation the plow 4 first forms the furrow, being steadied by the presence of the rudder-bar 9, after which when the loose dirt falls back into the furrow the small shovel 21 of the attachment forms in it a seed-receiving furrow, into which the seed drop and are subsequently covered by the shovels 17, following thereafter, as in lister planters and plows. In order to obviate blowing of the seed by the wind, a sheet-metal hood or conducting-leg 65 may be provided and depends from the platform.

Having described the invention, what I claim is—

1. The combination, with a plow comprising a beam, standard, and planting mechanism, of feed devices located in the planting mechanism, a pair of opposite X-shaped plates having their horizontal branches slotted and their vertical branches inwardly bent at their opposite edges, said plates being located at opposite sides of the beam, vertical standards located between the flanges of the plates and clamped by the same, bolts passed through the slots into the beams, a cranked axle located in bearings in the lower ends of the standards, a wheel thereon, and a pitman connected to the crank of the axle and to the feed mechanism of the planting mechanism, substantially as specified.

2. The combination, with a plow comprising a beam, handles, and a bifurcated pivoted standard depending from the rear end of the beam, of opposite metal clamp-sections, bolts passing through the upper and lower ends of the same above and below the beam, and a rudder-bar having its upper end pivoted to the lower bolt, passed rearwardly through the standard and terminating beyond the same in a depending blade, said bar having perforations adjacent to its intersection with the standard and a bolt passed transversely through the standard and one of the perforations of the bar, substantially as specified.

3. The combination, with the main beam and its standard and plow, of the opposite metal straps pivoted to the standard and terminating at their rear ends in depending standards carrying shovels, cross-bars connecting the beams, a central standard depending from the front cross-bar and carrying a shovel, a hopper surmounting the beams, feed mechanism mounted in the hopper, means for operating said mechanism, and the rudder-bar 9, loosely connected at its upper end to the main beam of the plow, adjustably connected to the standard of the plow and terminating at its rear end in rear of the plow in a blade, substantially as specified.

4. The combination, with the opposite beams terminating in shovels, the cross-bars, the front standard and its shovel, the plow-beam, the main standard, and the plow, of a platform surmounting the beams, the hopper surmounting the platform, the hopper-bottom being supported above said platform and it and the platform being provided with a longitudinal slot having end offsets and central half-circular openings, opposite reversely-disposed L-shaped plates removably fitted therein the ends of which have half-circular notches, said plates being located between the hopper-bottom and platform, a seed-slide mounted over the plates and having openings, a standard depending from the main beam, a wheel journaled in the standard, a pitman-rod connected to the crank of the axle of the wheel and extending opposite the hopper, and the connecting-rod between the pitman-rod and seed-slide, substantially as specified.

5. The combination, with the hopper and reciprocating seed-slide, of means for operating the slide and the block spanning the slide and having an opening, bristles located in the opening, a circular projection from the upper side of the block and having undercut edges, a ring encircling the projection, and wires connected to opposite sides of the ring and to the front and rear walls of the hopper, substantially as specified.

In testimony that I claim the foregoing as my own I have hereto affixed my signature in the presence of two witnesses.

THADDEUS W. KNIGHT.

Witnesses:
L. D. MURPHY,
T. S. SANDERS.